P. R. RIDGWAY.

Improvement in Trout-Baskets.

No. 129,592.  Patented July 16, 1872.

Witnesses.
W. Geo. Alden.
G. E. Boardman.

Philip R. Ridgway
by his attorney
H. Curtis.

UNITED STATES PATENT OFFICE.

PHILIP R. RIDGWAY, OF BOSTON, MASSACHUSETTS.

IMPROVEMENT IN TROUT-BASKETS.

Specification forming part of Letters Patent No. 129,592, dated July 16, 1872.

*To all to whom these presents shall come:*

Be it known that I, PHILIP R. RIDGWAY, of Boston, in the county of Suffolk and State of Massachusetts, have made an invention of a new and useful Manufacture of Trout or Fish Baskets; and do hereby declare the following to be a full, clear, and exact description thereof, due reference being had to the accompanying drawing making part of this specification, and in which—

Figure 1:
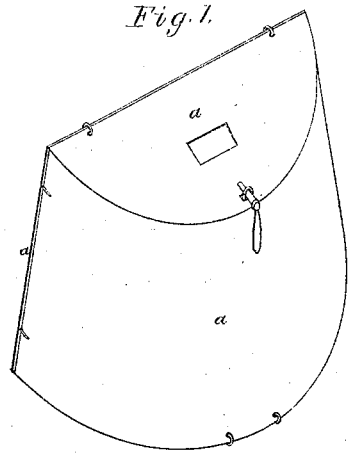
Figure 2:
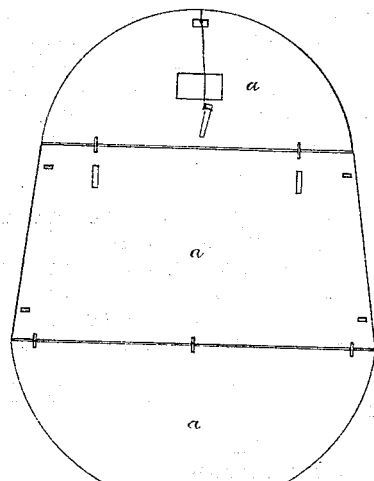
Figure 3:
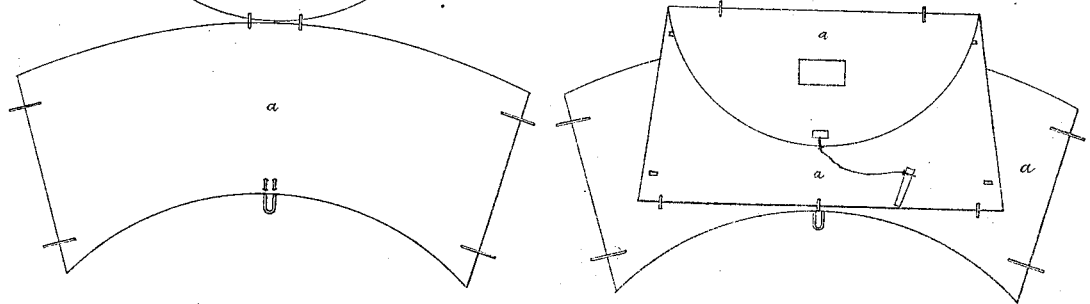

Figure 1 is a perspective view of my basket with its parts united together for use. Fig. 2 is a plan view of its various individual parts, into which the dismembered basket is divided for transportation or cleaning.

This invention consists in forming a basket of sections and so fashioning or providing said sections as to enable them to be readily connected together or detached, the purpose of the invention being twofold—that of greatly reducing the bulk of a basket for transportation or storage and of enabling the interior of a basket to be thoroughly washed and expeditiously and perfectly dried, both of which results are obtained by my invention, as the basket may be dismembered in a moment's time and extended upon a flat plane.

The drawing represents at *a a*, &c., a series of sections composed of willow wicker-work or other desirable material, these sections being four in number, and constructing the back, bottom, cover, and front of a trout-basket, such sections being of a size and form as, when joined together, to make up a basket of ordinary shape and capacity.

Any suitable means may be adopted to confine these sections together; but I do not, in any sense, confine myself to a particular method of effecting the union of such parts, as it is a trifling matter of convenience, economy, or taste.

Trout-baskets, though a luxury to an angler, are often left behind, owing to their bulky size. Dismembered, as I propose, they may be stowed in a small valise or overcoat-pocket, or other contracted place, and occupy but a fraction of the space now required.

Claim.

What I claim as my invention, and desire to secure by Letters Patent, is—

A trout or fish basket, the back, bottom, cover, and front of which are made of independent pieces or sections joined or held together, substantially as and for the purposes described.

PHILIP R. RIDGWAY.

Witnesses:
FRED. CURTIS,
W. E. BOARDMAN.